(12) United States Patent
Wildig et al.

(10) Patent No.: US 7,407,188 B2
(45) Date of Patent: *Aug. 5, 2008

(54) ROLL BAR ASSEMBLY FOR A VEHICLE

(75) Inventors: Charles Wildig, Oxon (GB); Robert Mackie, Warwickshire (GB); Paul Ottley, Northampton (GB); Chris Kavanagh, Bromsgrove (GB); Nigel Toney, Coventry (GB); John Mulherin, Essendon (AU)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/927,246

(22) Filed: Aug. 26, 2004

(65) Prior Publication Data

US 2005/0082808 A1    Apr. 21, 2005

(30) Foreign Application Priority Data

Aug. 27, 2003   (GB) ................................ 0319981.7

(51) Int. Cl.
*B60R 21/13*    (2006.01)
(52) U.S. Cl. ..................... 280/756; 180/271
(58) Field of Classification Search ................ 280/751, 280/753, 756; 180/271; *B60R 21/13*
See application file for complete search history.

(56) References Cited

U.S. PATENT DOCUMENTS

| 5,056,816 | A | 10/1991 | Lutze et al. |
|---|---|---|---|
| 5,094,478 | A | 3/1992 | Pfanzeder et al. |
| 5,205,585 | A | 4/1993 | Reuber et al. |
| 5,458,396 | A | 10/1995 | Rost |
| 5,927,803 | A | 7/1999 | Hehl et al. |
| 6,352,285 | B1 | 3/2002 | Schulte et al. |
| 2003/0001733 | A1 | 1/2003 | Huang |

FOREIGN PATENT DOCUMENTS

| EP | 0952042 B1 | 10/1999 |
|---|---|---|
| EP | 0976621 B1 | 2/2000 |
| EP | 1304266 B1 | 4/2003 |
| GB | 2157543 A | 10/1985 |
| GB | 2157543 A | 10/1985 |
| GB | 2203-706 A | 10/1988 |
| WO | WO 0055015 | 9/2000 |

*Primary Examiner*—Ruth Ilan
(74) *Attorney, Agent, or Firm*—Dickinson Wright PLLC; Gigette Bejin (57) ABSTRACT

A roll bar assembly capable of punching through a rear window on deployment comprises a deployable u-shaped roll bar fitted with a pin made of hard material. The pin may be fixed to an upper surface of the roll bar or may be housed inside the top portion of the roll bar and deployed at the appropriate moment by pyrotechnic means.

22 Claims, 8 Drawing Sheets

Fig. 9

ROLL BAR ASSEMBLY FOR A VEHICLE

FIELD OF THE INVENTION

This invention relates to roll bar assemblies for vehicles and particularly for convertible motor vehicles having a rear window made of glass.

BACKGROUND OF THE INVENTION

Many convertible vehicles are provided with roll bars or hoops for protecting the driver and passengers in the event of the vehicle overturning. Some roll bars currently found on motor vehicles are fixed in position and some are stowed in a retracted position out of sight and deployed when required.

GB-A-157543 discloses a deployable roll bar which pivots from a horizontal stowed position to a vertical deployed position. The roll bar is located behind the front seat of a vehicle and is triggered by means of a pyrotechnic device in conjunction with a sensor responsive to vehicle rotational acceleration or angle of rotation.

U.S. Pat. No. 5,458,396 discloses a deployable u-shaped roll bar that is stowed in a retracted position in the headrest or backrest of a seat and which extends upwards above an occupant's head in a deployed position. The roll bar's deployment system includes a spring-loaded release member and a hold member so that on deployment, the roll bar may be forced upwards by the action of the spring and locked in an extended position by the hold member.

GB-A-2,184,586 discloses sensor means for controlling deployment of a roll bar. A first sensor comprises an inertia switch located centrally in the vehicle and a second sensor means comprises switches located on the rear wheels of the vehicle, each switch being closed when the rear wheel suspension is completely extended, and a third sensor comprising a tilt switch. This combination of switches facilitates deployment of the roll bar when overturning of the vehicle is imminent and inhibits deployment when the vehicle is lifted in a workshop or is driven over a hump.

When designing either fixed or deployable roll bar arrangements for motor vehicles, certain constraints have to be taken into account.

Firstly packaging constraints must be considered, so that the roll bar can be located in the vehicle optimally.

Additionally for protection, the static or deployed position has to be sufficiently high in order to offer a protective 'zone' in which the occupants are retained, thus avoiding or minimising contact between an occupant's head and the road surface when the vehicle is rolling or static on the ground.

Further, there must be allowance for the operation of a roof-folding mechanism and the travel envelope when folding or unfolding the roof.

Deployable roll bars must be able to reach a point where protection is afforded irrespective of the position of the roof, i.e. up or down.

Known roll bar arrangements meet the above constraints by virtue of roof design. That is, the roof is positioned so that it clears the roll bar in its deployed condition, thus allowing the roll bar to function in either case of roof position, up or down. This has led to a compromise on the styling, aerodynamics and other factors related to the roof design, this being undesirable from a marketing and competitive point of view.

Thus there is a need for a deployable roll bar which will operate within the constraints mentioned above and which will allow design freedom with regard to the overall appearance of the vehicle, particularly the roof-line, the size and location of the rear window and the possibility of utilising glass as the material for the rear window.

SUMMARY OF THE INVENTION

In a first aspect, the present invention provides a roll bar assembly for a vehicle, said assembly including a deployable roll bar incorporating a device for breaking a rear window of the vehicle on deployment of the roll bar.

In a second aspect, the present invention provides a seat for a vehicle, which in said seat is incorporated the roll bar assembly in accordance with said first aspect recited above.

In a third aspect, the present invention provides a vehicle incorporating the roll bar assembly in accordance with said first aspect recited above.

In a fourth aspect, the present invention provides a vehicle incorporating the seat in accordance with said second aspect recited above.

In one embodiment, the device comprises a pin, in part fixed to and in part, protruding from an upper surface of the roll bar.

The pin may be fixed to the upper surface of the roll bar by means of a threaded joint.

A protruding part of the pin may have a conical, frusto-conical or domed shape. Such shapes have been found to break a glass window satisfactorily, causing it to shatter into small pieces. Preferably, the protruding part of the pin is made from a hard material having a hardness of at least 1000 Vickers, e.g. tungsten carbide.

In an alternative embodiment, the roll bar is provided with an orifice in an upper surface thereof, and the device comprises a pyrotechnic actuator incorporating a deployable pin, said actuator being located within the roll bar such that on deployment of the actuator, the deployable pin extends through the orifice beyond the upper surface of the roll bar.

This alternative embodiment is advantageous in that in the stowed, non-deployed position, no protrusion extends from the roll-bar. It also optimises styling freedom through the ability to locate the roof of the vehicle and trim features in lower positions. (The embodiment having fixed, protruding pins requires extra clearance space between the roll bar and vehicle trim). The alternative embodiment is also safer to handle during vehicle assembly and service.

The pyrotechnic actuator may be fixed to the upper surface of roll bar by means of a threaded joint.

An upper part of the deployable pin may be conical, frusto-conical or dome shaped.

An upper part of the deployable pin may be composed of tungsten carbide, or any suitable material having a hardness of at least 1000 Vickers.

In either embodiment, the roll bar assembly may further include spring-loaded means and a solenoid switch for effecting deployment of the roll bar. Alternatively, the spring-loaded means may be activated by pyrotechnic means rather than a solenoid switch. Alternatively to the spring-loading, the roll bar may be actuated pyrotechnically.

The roll bar and breaking device may be included in the back rest of one or all of the seats of a vehicle and the roll bar may be an inverted u-shape. Alternatively, a roll bar and breaking device may be located behind one or all of the seats of the vehicle, or may be positioned behind the seats and extend across the vehicle from one side to the other. The roll bar may include just one breaking device preferably located close to an outboard shoulder of the 'U' or two devices, each located close to each shoulder of the 'U'.

The inclusion of two breaking devices ensures that, no matter whether the roll bar is fitted to either a left hand seat or a right hand seat, on deployment, the pin will hit the rear window before the roll bar does. If only one breaking device is incorporated, then depending on where it is located, its length has to be chosen so that on deployment, it makes contact with the rear window before any other part of the roll bar does.

In either case where the roll bar and breaking device is fitted to a seat or behind a seat, the invention further provides an optional item of trim which is frangible and located so as to cover the roll bar when the roll bar is in a stowed position and to fracture on deployment of the roll bar.

Alternatively the item of trim may be removable and displaced on deployment of the roll bar.

Provision of such means for covering the roll bar and breaking means whilst in the stowed, non-deployed position not only benefits styling but also, in the case of the embodiment having a fixed protruding pin, it prevents items of clothing, luggage or passengers themselves from coming into contact with the pin. The item of trim may form a part of the seat assembly or part of the vehicle trim.

The roll bar assembly may further include a sensor for detecting imminent rollover of the vehicle and for generating control signals for deployment of the roll bar and of the pyrotechnic actuator (if fitted.)

A delay may be introduced between deployment of the roll bar and deployment of the actuator so that the roll bar can first puncture or displace and clear any covering trim provided before the pin is ejected through the orifice provided in the roll bar. This ensures that the pin will not catch on the trim as it moves upwards on deployment.

Hence the present invention provides a means for allowing deployment of a roll bar through a vehicle roof, specifically the rear window glass, so that the desired deployed position of the roll bar can be reached irrespective of roof position.

It has been discovered by the inventors that a conventional roll bar without the provision of a breaking device is incapable of fracturing a glass rear window on deployment, unless the energy of the deployment is increased to such a level whereby static loads on the roll bar assembly are unacceptably high and so the risk of injury in mis-use situations increases.

BRIEF DESCRIPTION OF THE DRAWINGS

Some embodiments of the invention will now be described by way of example only with reference to the drawings, of which.

DETAILED DESCRIPTION OF THE PREFERRED EMBODIMENTS

Figure 1:
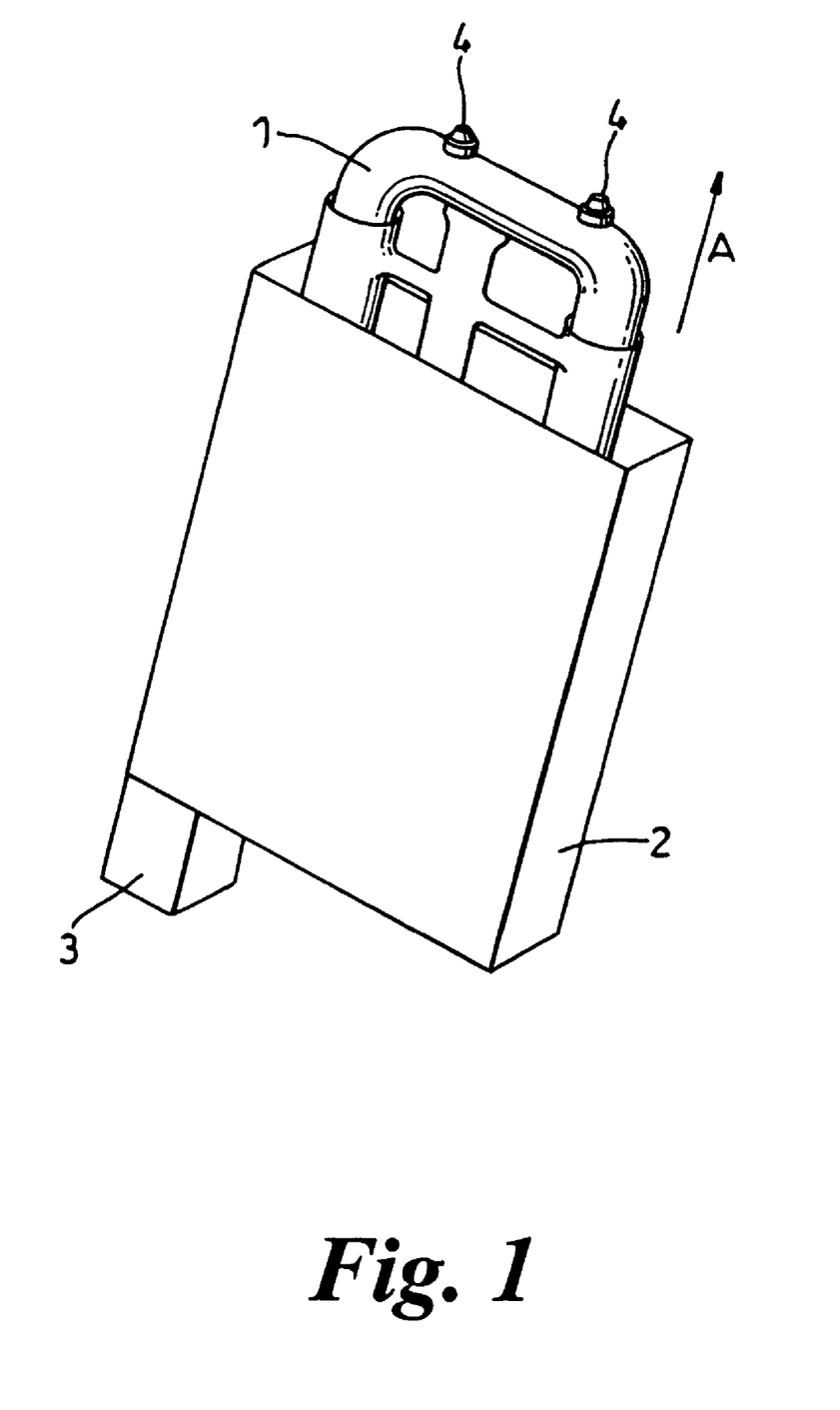
FIG. 1 is a perspective view of a roll bar arrangement in accordance with a first embodiment.

In FIG. 1 a hollow inverted u-shaped roll bar 1 co-operates with a roll bar release mechanism 2 (whose housing alone is shown in FIG. 1 for the sake of clarity). In this example the release mechanism is a spring-loaded arrangement. (Alternatively, the spring-loaded arrangement could be replaced with a pyrotechnic mechanism). The release mechanism is activated by a release device 3 which in this example is a solenoid switch. (As an alternative, a pyrotechnic actuator could be used).

The roll bar 1, spring-loaded arrangement 2 and solenoid switch 3, operate in a known manner, i.e. when a remotely-generated trigger signal is received by the solenoid switch 3, the switch activates the release mechanism 2 and as a consequence, the roll bar 1 is deployed upwards out of the housing 2 (in the direction of arrow A). Conventional locking means (not shown) prevent the roll bar 1 from moving any further or from being pushed back into the housing by any external force once the roll bar 1 has reached its fully-deployed position.

In accordance with the first embodiment, the roll bar 2 is fitted with two pins 4.

Figure 2:
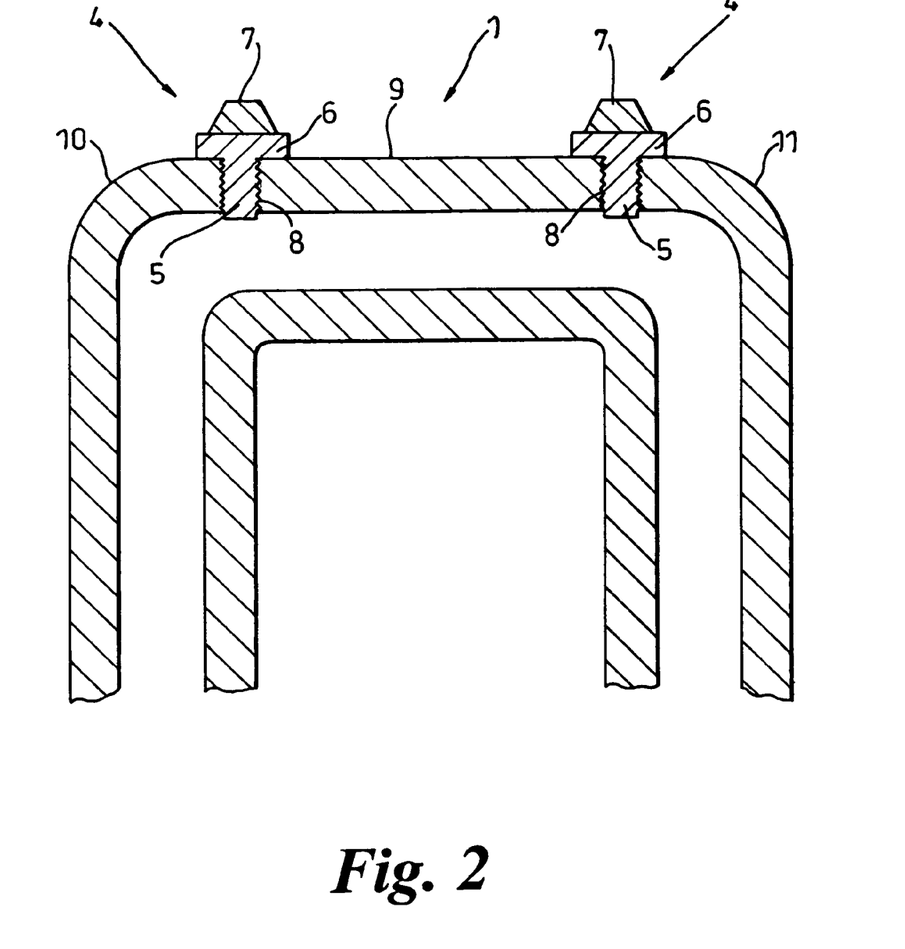
FIG. 2 is a cross-sectional view of the roll bar FIG. 1

With reference to FIG. 2, each pin 4 consists of a threaded portion 5, an integral lock nut 6 and an end portion 7 having a frusto-conical form. The threaded portion co-operates with a tapped hole 8 in the upper surface 9 of the roll bar. Each pin 4 is located close to the shoulders 10, 11 of the roll bar. The threaded portion 5 and lock nut 6 are made of steel and the end portion 7 is composed of tungsten carbide and bonded to the lock nut 6 using a suitable epoxy resin adhesive. (Alternatively, the end portion 7 can be brazed to the lock-nut 6).

Figure 3A:
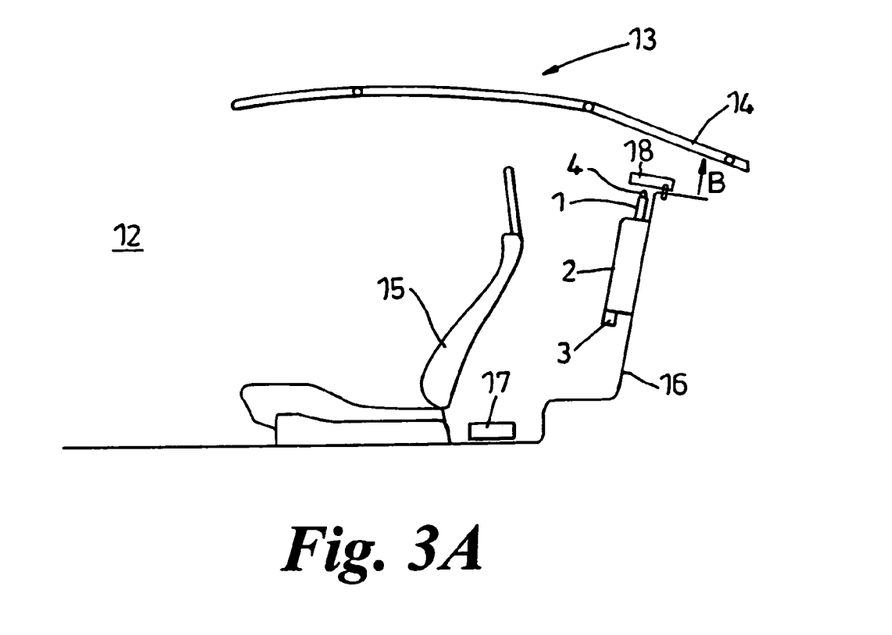
FIGS. 3A and 3B are schematic diagrams illustrating the incorporation of the embodiment of FIG. 1 in a vehicle in a stowed position (FIG. 3A) and a deployed position (FIG. 3B)

With reference now to FIG. 3A the roll bar arrangement of FIGS. 1 and 2 is shown incorporated in a convertible vehicle 12 which includes a removable or folding roof 13 incorporating rear window 14 made of glass, a seat 15 and rear bulkhead 16. The rest of the vehicle is omitted for the sake of clarity. The roll-bar arrangement 1, 2, 3, 4 of FIGS. 1 and 2 is secured to the rear bulkhead 16 behind the seat 15. Also fitted to the vehicle is a vehicle motion sensor 17, of conventional design, whose electrical output (not shown) is connected to the solenoid switch 3.

An item of trim 18 is positioned over the upper surface of the roll bar, hiding the roll bar 1 from view whilst in its un-deployed, stowed position in the housing 2.

Figure 3B:
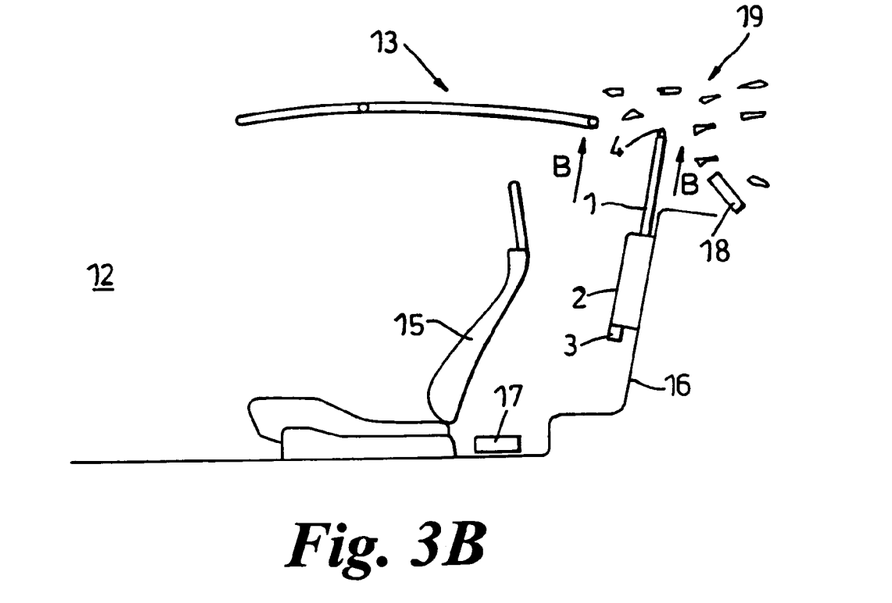

Operation of the embodiment of FIG. 3A will now be described with particular reference to FIG. 3B.

When the vehicle motion sensor 17 detects that rollover of the vehicle 12 is imminent, it transmits a trigger signal to the solenoid switch 3 which in turn, activates the release mechanism 2. Consequently, the roll bar 1 is rapidly deployed upwards (in the direction of arrow B). As the roll bar 1 deploys in this way, it displaces the trim item 18 and continues upwards towards the glass rear window 14 whereupon the end portion 7 of at least one of the pins 4 strikes the window causing the latter to shatter into many fragments 19. Once the roll bar 1 is deployed to its fullest extent, it locks in position just beyond the roof line as defined by the profile of the rear window 14 and clear of the head of any occupant of the seat 15, thus affording the necessary protection.

Figure 4:
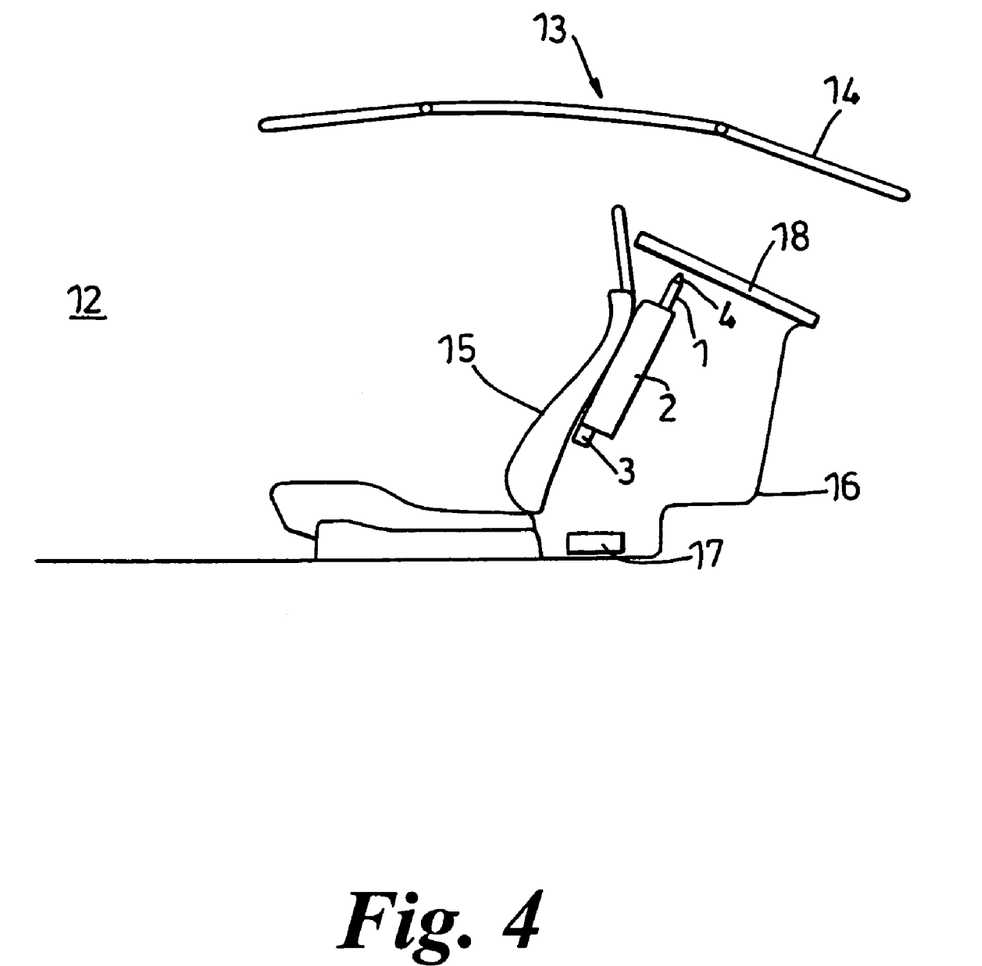
FIG. 4 is a schematic diagram illustrating the incorporation of the embodiment of FIG. 1 in a vehicle seat.

The alternative arrangement of FIG. 4 shows the roll bar arrangement of FIGS. 1 and 2 incorporated in the backrest of the seat 15 rather than being attached to the rear bulkhead. Also in this example, the trim item 18 is made of a frangible material. Otherwise, the constituents of the arrangement illustrated in FIG. 4 are the same as those in FIGS. 3A and 3B.

On deployment of the arrangement of FIG. 4, as the roll bar 1 is deployed upwards, it first breaks through the frangible trim item 18 and then strikes and shatters the rear window 14.

A second embodiment will now be described with reference to FIGS. 5, 6 and 7.

Figure 5:
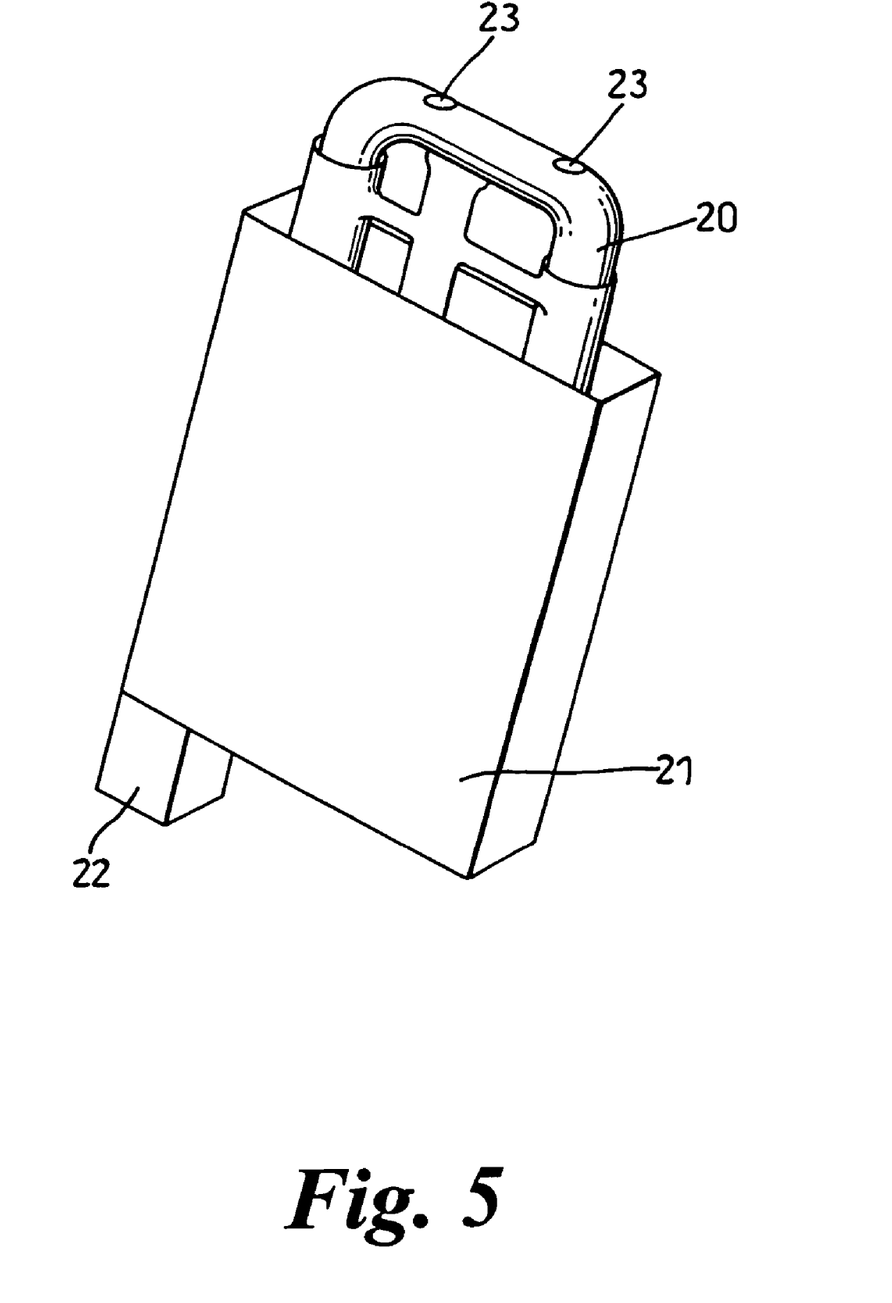
FIG. 5 is a perspective view of a roll bar arrangement in accordance with a second embodiment.

In FIG. 5 a hollow inverted u-shaped roll bar 20 co-operates with a roll bar release mechanism 21 (whose housing alone is shown in FIG. 1 for the sake of clarity). In this example the release mechanism is a spring-loaded arrangement. (Alternatively, the spring-loaded arrangement could be replaced with a pyrotechnic mechanism). The release mechanism is activated by release device 22 which in this example is a solenoid switch. (As an alternative, a pyrotechnic actuator could be used).

The roll bar 20, spring loaded arrangement 21 and solenoid switch 22 operate in a known manner, i.e. when a remotely-generated trigger signal is received by the solenoid switch 22, the switch activates the release mechanism 21 and as a consequence, the roll bar 20 is deployed upwards out of the housing 21 (in the direction of arrow A). Conventional locking means (not show) prevent the roll bar 20 from moving any further or from being pushed back into the housing by any external force once the roll bar 20 has reached its fully-deployed position. The delay between receiving a trigger signal at the solenoid switch 22 and deployment of the roll bar 20 is typically no more than 150 ms.

In accordance with the second embodiment, the roll bar 20 is fitted with two pyrotechnic actuators 23 to be described hereinbelow.

Figure 6:
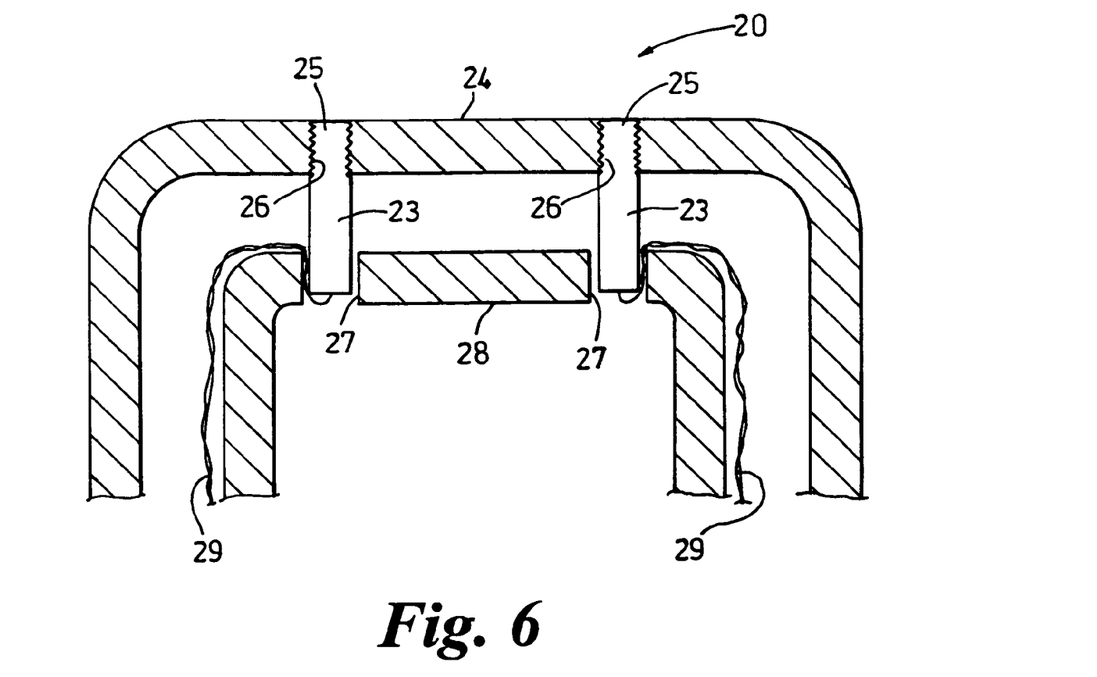
FIG. 6 is a partially-sectional view of the roll bar of FIG. 5.

With particular reference to FIG. 6, each pyrotechnic actuator 23 is secured to an upper surface 24 of the roll bar 20 by means of a screw-threaded part 25 which co-operates with a tapped hole 26 in the upper surface 24. Each actuator 23 is positioned so that its upper face is substantially flush with the upper surface 24 of the roll bar 20 and is put into position by feeding it through an access hole 27 provided in a lower surface 28 of the roll bar 20. Electrical leads 29, connecting each actuator 23 to a control circuit (to be described hereinbelow), are fed through the hollow part of the roll bar 20 into the housing 21.

Inside each pyrotechnic actuator 23 is a combustion chamber, stored pyrotechnic material in powder form and a deployable pin 30 having an end portion 31, frusto-conical in form and made from tungsten carbide. A signal supplied via the electrical leads 29 activates an igniter inside the actuator. The time delay between ignition and deployment of the pin to its fullest extent is typically 2 ms.

Figure 7:
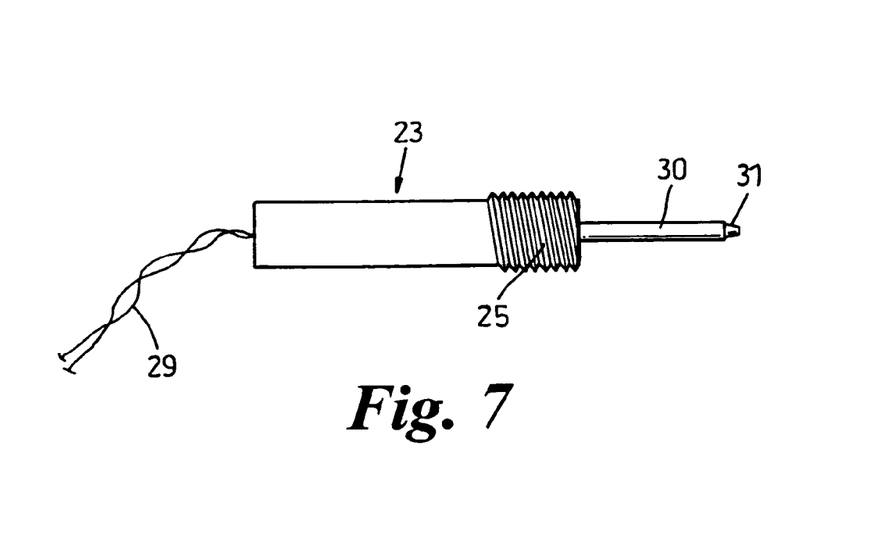
FIG. 7 is a plan view of a pyrotechnic actuator in a deployed configuration.

FIG. 7 shows a pyrotechnic actuator 23 in its deployed configuration with the pin 30 having been ejected from its stowed position.

Each actuator 23 deploys its pin 30 in a conventional manner, and is locked into a fixed position once it has been deployed to its fullest extent.

Figure 8A:
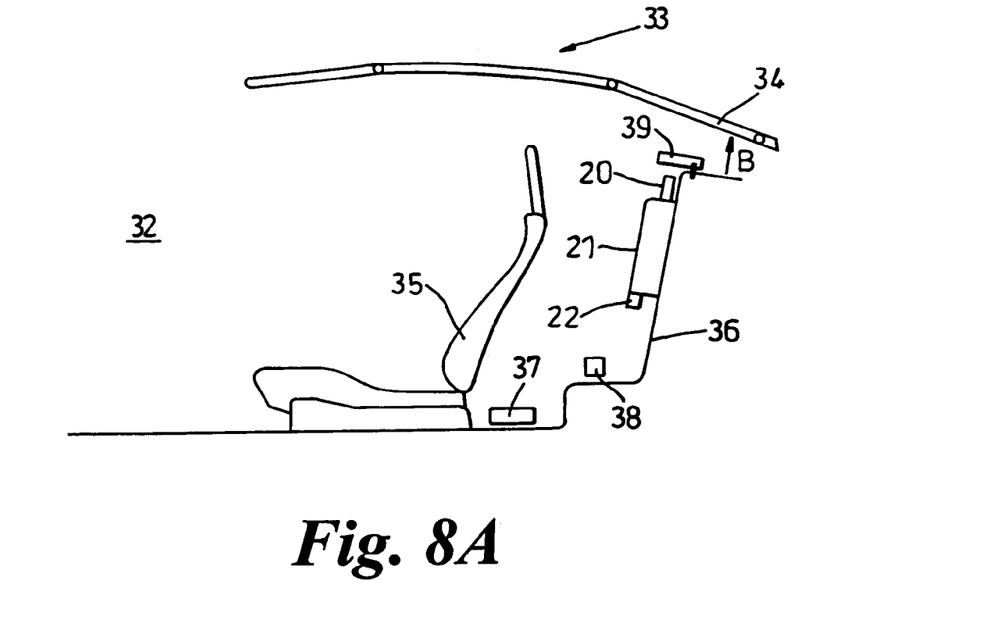
FIGS. 8A and 8B are schematic diagrams illustrating the incorporation of the embodiment of FIG. 5 in a vehicle in a stowed position (FIG. 8A) and a deployed position (FIG. 8B)

With reference now to FIG. 8A the roll bar arrangement of FIGS. 5 and 6 is shown incorporated in a convertible vehicle 32 which includes a removable or folding roof 33 incorporating rear window 34 made of glass, a seat 35 and a rear bulkhead 36. The rest of the vehicle is omitted for the sake of clarity. The roll bar arrangement 21, 22, 23, 24 of FIGS. 5 and 6 is secured to the rear bulkhead 36 behind the seat 35. Also fitted to the vehicle is a vehicle motion sensor 37, of conventional design, whose electrical output (not shown) is connected to the solenoid switch 22.

A delay circuit 38 is also fitted to the vehicle. This circuit is electrically connected to the motion sensor 37 and to each pyrotechnic actuator 23.

An item of trim 39 is positioned over the upper surface of the roll bar, so hiding the roll bar 20 from view whilst in its undeployed, stowed position in the housing 21.

Figure 8B:
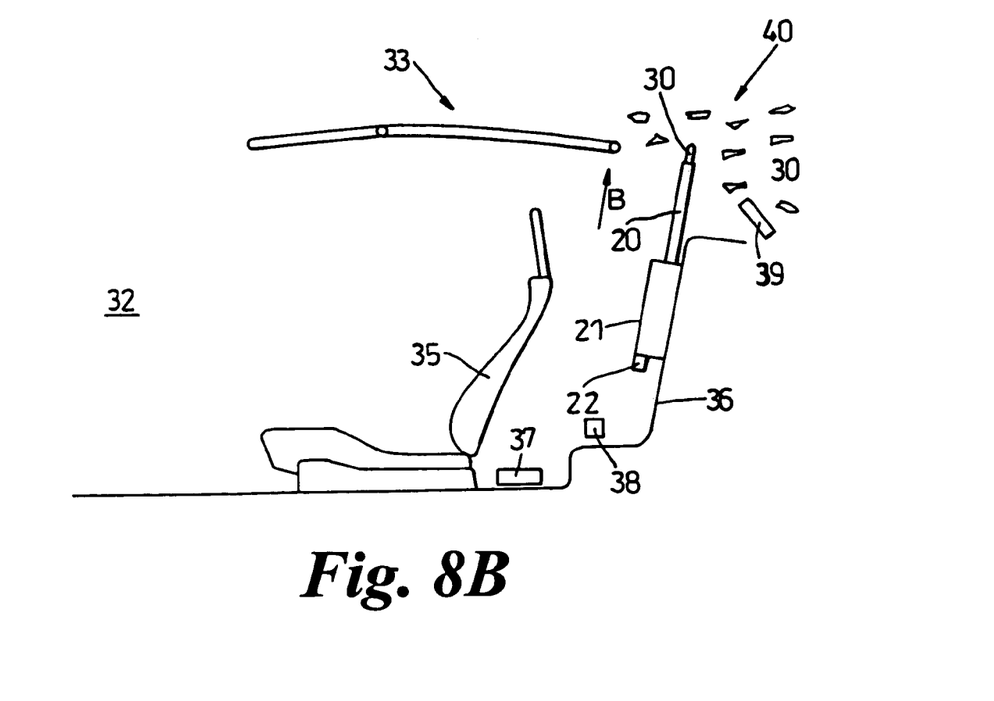

Operation of the embodiment of FIG. 8A will now be described with particular reference to FIG. 8B.

When the vehicle motion sensor 37 detects that rollover of the vehicle 32 is imminent it generates and transmits a trigger signal to the solenoid switch 22 and to the delay circuit 38. Consequently, the solenoid switch 22 activates the release mechanism 21 and the roll bar 20 commences to move upwards in the direction of arrow B.

As the roll bar 20 deploys in this way, it displaces the trim item 39 and continues upwards towards the glass rear window 34. After a pre-determined time delay corresponding to the time elapsed between generation of the trigger signal by the motion sensor 37 and the roll bar 20 displacing the trim item 39, the delay circuit relays the trigger signal to the pyrotechnic actuators 23 which fire their pins 30. As the pins 30 reach their fully deployed position, the end portion 31 of at least one of the pins 30 strikes the window 34 causing the latter to shatter into many fragments 40. Once the roll bar 20 is deployed to its fullest extent, it locks in position just beyond the roof line as defined by the profile of the rear window 34 and clear of the head of any occupant of the seat 35, thus affording the necessary protection.

Figure 9:
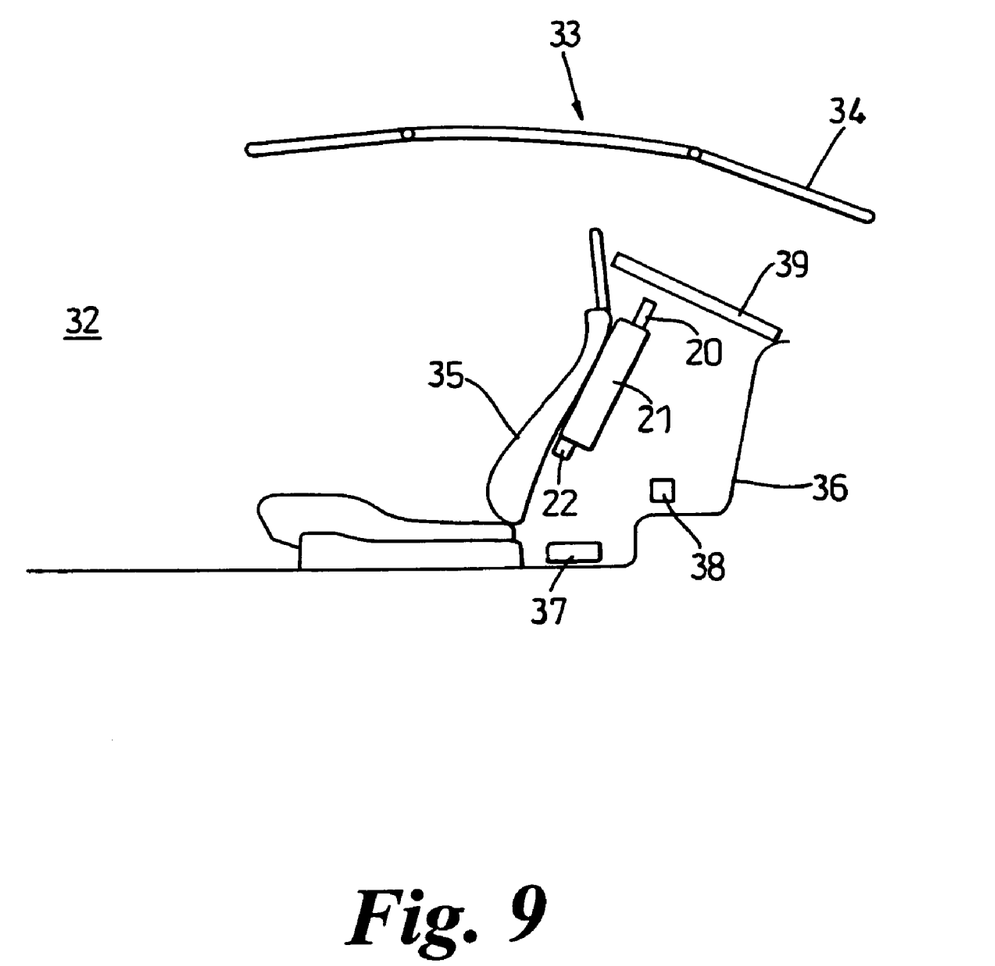
FIG. 9 is a schematic diagram illustrating the incorporation of the embodiment of FIG. 5 in a vehicle seat.

The alternative arrangement of FIG. 9 shows the roll bar arrangement of FIGS. 5 and 6 incorporated in the backrest of the seat 35 rather than being attached to the rear bulkhead. Also in this example, the trim item 39 is made of frangible material. Otherwise, the constituents of the arrangement illustrated in FIG. 9 are the same as those in FIGS. 8A and 8B, and they operate in the same manner. On deployment of the arrangement of FIG. 9, as the roll bar 20 is deployed upwards, it first breaks through the frangible trim item 39. Once this is cleared, the actuator pins 30 are deployed and the roll bar 20 continues upwards, whereupon the end portion 31 of at least one of the pins 30 strikes the window 34 causing it to shatter.

What is claimed is:

1. A roll bar assembly for a vehicle, the assembly comprising:
    a deployable roll bar; and
    a breaking device being operative to break a rear window of the vehicle on deployment of the roll bar;
    the breaking device being a pin, in part fixed to and in part protruding from an upper surface of the roll bar with said pin being fixed to an upper surface of the roll bar by means of a threaded joint.

2. A roll bar assembly according to claim 1 wherein the pin includes a protruding portion having a frusto-conical form.

3. A roll bar assembly according to claim 1 wherein the protruding portion of the pin is composed of tungsten carbide.

4. A roll bar assembly according to claim 1 further comprising a spring-loaded means and a solenoid switch for effecting deployment of the roll bar.

5. A roll bar assembly according to claim 1 further comprising a spring-loaded means and a pyrotechnic device for effecting deployment of the roll bar.

6. A roll bar assembly according to claim 1 further comprising a pyrotechnic means for effecting deployment of the roll bar.

7. A roll bar assembly according to claim 1 further comprising a sensor means for detecting imminent rollover of the vehicle and for generating a control signal for deployment of the roll bar.

8. A roll bar assembly according to claim 1, wherein the assembly further comprises a vehicle seat affixed to the roll bar.

9. The roll bar assembly according to claim 1, further including an item of trim which is frangible and located so as to cover the roll bar when the roll bar is in a stowed position and to fracture on deployment of the roll bar.

10. A roll bar assembly according to claim 1, further including an item of removable trim which is located so as to cover the roll bar when the roll bar is in a stowed position and to be displaced on deployment of the roll bar.

11. A roll bar assembly according to claim 1 wherein the deployable roll bar is an inverted u-shape and in which the device is positioned close to the shoulder of the u-shape.

12. A roll bar assembly according to claim 1 wherein the deployable roll bar is an inverted u-shape and incorporates two of said devices for breaking the rear window, one device positioned close to a first shoulder of the u-shape and one device positioned close to the other shoulder of the u-shape.

13. A roll bar assembly according to claim 1, wherein the roll bar is provided with an orifice in an upper surface thereof and wherein the device comprises a pyrotechnic actuator incorporating a deployable pin, said actuator being located within the roll bar such that on deployment of the actuator, the deployable pin extends through the orifice beyond the upper surface of the roll bar.

14. A roll bar assembly according to claim 13 in which the pyrotechnic actuator is fixed to the upper surface of the roll bar by means of a threaded joint.

15. A roll bar assembly according to claim 13 in which an upper part of the deployable pin is frusto-conical in form.

16. A roll bar assembly according to claim 13 in which an upper part of the deployable pin is composed of tungsten carbide.

17. A roll bar assembly according to claim 13 and further including spring-loaded means and a solenoid switch for effecting deployment of the roll bar.

18. A roll bar assembly according to claim 13 and further including spring-loaded means and a pyrotechnic device for effecting deployment of the roll bar.

19. A roll bar assembly according to claim 13 and further including pyrotechnic means for effecting deployment of the roll bar.

20. A roll bar assembly according to claim 13 and further including means for detecting imminent roll over of the vehicle and generating a control signal for deployment of the roll bar and of the pyrotechnic actuator.

21. A roll bar assembly for a vehicle, the assembly comprising:
   a deployable roll bar; and
   a breaking device being operative to break a rear window of the vehicle on deployment of the roll bar;
   said breaking device being a pin, in part fixed to and in part protruding from an upper surface of the roll bar;
   said pin including a protruding portion having a frusto-conical form.

22. A roll bar assembly for a vehicle, the assembly comprising:
   a deployable roll bar; and
   a breaking device being operative to break a rear window of the vehicle on deployment of the roll bar;
   said deployable roll bar having an orifice in an upper surface thereof;
   said breaking device being a pyrotechnic actuator incorporating a deployable pin;
   said pyrotechnic actuator being located within said deployable roll bar such that on deployment of said actuator, said deployable pin extends through said orifice beyond said upper surface of said deployable roll bar.

* * * * *